(12) United States Patent
Demott et al.

(10) Patent No.: US 10,604,435 B2
(45) Date of Patent: Mar. 31, 2020

(54) SUBMERGED COMBUSTION MELTER AND METHOD

(71) Applicants: KNAUF INSULATION, Vise (BE); KNAUF INSULATION DOO SKOFJA LOKA, Skofja Loka (SI); KNAUF INSULATION GMBH, Iphofen (DE); KNAUF INSULATION, INC., Shelbyville, IN (US)

(72) Inventors: Gerard Demott, Majcichov (SK); Bostjan Marolt, Poljane (SI); David Ducarme, Wavre (BE); Randy Etzkorn, Visé (BE)

( * ) Notice: Subject to any disclaimer, the term of this patent is extended or adjusted under 35 U.S.C. 154(b) by 100 days.

(21) Appl. No.: 15/546,762

(22) PCT Filed: Jan. 27, 2016

(86) PCT No.: PCT/EP2016/051737
§ 371 (c)(1),
(2) Date: Jul. 27, 2017

(87) PCT Pub. No.: WO2016/120353
PCT Pub. Date: Aug. 4, 2016

(65) Prior Publication Data
US 2018/0022629 A1    Jan. 25, 2018

(30) Foreign Application Priority Data

Jan. 27, 2015 (GB) .................................. 1501315.4

(51) Int. Cl.
C03B 5/235    (2006.01)
C03B 5/12    (2006.01)
(Continued)

(52) U.S. Cl.
CPC .............. *C03B 5/2356* (2013.01); *C03B 5/12* (2013.01); *C03B 5/237* (2013.01); *C03B 5/43* (2013.01); *C03B 37/02* (2013.01); *C03B 2211/70* (2013.01)

(58) Field of Classification Search
None
See application file for complete search history.

(56) References Cited

U.S. PATENT DOCUMENTS 3,990,878 A * 11/1976 Troyankin ................ C03B 5/12
65/347
4,366,571 A * 12/1982 Palmquist ............... C03B 5/425
373/30
(Continued)

OTHER PUBLICATIONS

David Rue: "Energy-efficient glass melting—the next generation melter—Final report", Gas Technology Institute Project 20621, Mar. 1, 2008 (Mar. 1, 2008), XP055077368, Retrieved from the internet: URL: XP55077368 (retrieved on Sep. 2, 2013) p. 4, lines 28-39,53; Figures 4,24,58, pp. 1,25.
(Continued)

*Primary Examiner* — Lisa L Herring
(74) *Attorney, Agent, or Firm* — Knauf Insulation, Inc.; James K. Blodgett; Brandon N. Hudder (57) ABSTRACT

The present invention relates to a melter assembly (1) for melting solid raw batch material, which comprises a submerged combustion melter section (3) and an afterburner section (5), wherein the submerged combustion melter section is designed to contain the melt bath (4) at a maximum melt level (4') and comprises at least one submerged combustion burner (21) and a melt outlet (9), and wherein the afterburner section (5) is designed as a space contiguous with, and in continuity of, the internal space defined by the submerged combustion melter section (3), and arranged over the maximum melt level (4') of the submerged combustion
(Continued)

melter section (3). The afterburner section (5) is dimensioned such that the gases escaping from the melt bath (4) remain for at least 2 seconds at a temperature of at least 850° C. in said afterburner section (5), prior to being evacuated to the environment. The invention also relates to a process making use of such melter assembly (1).

18 Claims, 4 Drawing Sheets

(51) Int. Cl.
 *C03B 5/43* (2006.01)
 *C03B 5/237* (2006.01)
 *C03B 37/02* (2006.01)

(56) References Cited

U.S. PATENT DOCUMENTS

| | | | | |
|---|---|---|---|---|
| 4,944,785 A | * | 7/1990 | Sorg | B09B 3/005 |
| | | | | 422/168 |
| 5,134,944 A | * | 8/1992 | Keller | B09B 3/00 |
| | | | | 110/229 |
| 2002/0162358 A1 | * | 11/2002 | Jeanvoine | C03B 5/225 |
| | | | | 65/134.5 |
| 2004/0110458 A1 | * | 6/2004 | Kato | B01D 53/86 |
| | | | | 454/1 |
| 2004/0131988 A1 | * | 7/2004 | Baker | C03B 5/235 |
| | | | | 432/195 |
| 2007/0122332 A1 | * | 5/2007 | Jacques | C01B 33/20 |
| | | | | 423/331 |
| 2008/0256981 A1 | | 10/2008 | Jacques et al. | |
| 2011/0236846 A1 | * | 9/2011 | Rue | F27B 3/205 |
| | | | | 432/195 |
| 2011/0308280 A1 | * | 12/2011 | Huber | C03B 5/04 |
| | | | | 65/126 |
| 2012/0077135 A1 | * | 3/2012 | Charbonneau | C03B 3/00 |
| | | | | 432/11 |
| 2013/0086950 A1 | | 4/2013 | Huber et al. | |
| 2013/0086951 A1 | | 4/2013 | Charbonneau et al. | |
| 2013/0260980 A1 | * | 10/2013 | Touslee | C03B 5/005 |
| | | | | 501/35 |
| 2014/0242527 A1 | * | 8/2014 | Galley | F23D 14/22 |
| | | | | 431/8 |
| 2015/0225274 A1 | | 8/2015 | Solvang et al. | |

OTHER PUBLICATIONS

Olabin V M et Al: "Submerged combustion furnace for glass melts", Ceramic engineering and science proceedings, American Ceramic Society Inc, US, vol. 17, No. 2, Jan. 1, 1996 (Jan. 1, 1996), pp. 84-92, XP000622568, ISSN: 0196-6219, Table II in p. 89; pp. 84,85,89; figures 1,3,5.

* cited by examiner

SUBMERGED COMBUSTION MELTER AND METHOD

CROSS-REFERENCE TO RELATED APPLICATIONS

This application is a U.S. national counterpart application of International Application Serial No. PCT/EP2016/051737, filed Jan. 27, 2016, under 35 U.S.C. § 371, which claims priority to GB Application Serial No. 1501315.4, filed Jan. 27, 2015, the disclosures of which are hereby incorporated herein by reference.

FIELD OF THE INVENTION

The present invention relates to submerged combustion melters, notably for melting vitreous or vitrifiable material, and to processes using a submerged combustion melter.

BACKGROUND OF THE INVENTION

Vitreous materials are generally manufactured from a mixture of raw materials, for example silicates, basalt, limestone, soda ash and other minor constituents which are introduced into a melter and melted into a viscous liquid state at temperatures in the order of 1250 to 1500° C.; the melt is then supplied to a forming process. Depending on the intended use of the melt, for example for manufacture of flat glass, hollow glass, continuous fibers, such as fibers for reinforcement purposes or fibers for insulation purposes, a melt refining step may be required upstream of the forming process. The chemical composition of the melt and its physical properties are selected as a function of the intended use and the forming process.

Vitrifiable material as referred to herein includes raw materials for glass melting or manufacturing, but also other raw materials, including but not limited to waste and recycled materials, that may be melted and vitrified, like stone, rock, shale, ceramics and the like. The present description mainly refers to glass melting, as an example, but obviously extends to the production of melts that may be different from glass in its narrow sense.

Conventional glass melters comprise an energy supply from above a glass melt surface, for example from burners generating a flame in a space between the glass melt surface and a crown of the melter, whereby heat is transferred to the glass melt by the flame itself and by radiation from the crown material. Raw batch material to be melted is loaded at the top of the glass melt in the melter and heat is transferred from the melt to the batch material which is incorporated into the melt.

In some glass melters, energy is supplied by electrically heated electrodes arranged below the surface of the melt; such electrodes may provide the only heat source or be used in combination with burners.

A further type of glass melter has one or more burner nozzles arranged below the surface of the melt such that the burner flames and/or combustion products pass through the melt. This arrangement is referred to as submerged combustion.

Such submerged combustion melters generate high volumes of exhaust fumes. In view of ever increasing requirements with respect to environmental pollution and/or sustainable production processes, it is required to transfer the exhaust gases through so-called afterburners. One of the major roles of an afterburner is to ensure complete combustion of potentially remaining combustible elements and reduction of NOx content in the exhaust fumes released to the environment. Generally such afterburners are mounted in the exhaust system and consist in an enlarged chamber allowing for increased residence time of given gas volumes in said enlarged chamber at conditions of temperature and pressure that are suitable for detoxification of the exhaust to a required extent. Depending on the arrangement of the exhaust system, the afterburner may require additional energy input, including heating and/or fuel injection, in order to generate the required pressure and temperature conditions for reaction of remaining combustible elements and/or detoxification of remaining reactive elements.

SUMMARY OF THE INVENTION

The present invention now seeks to provide an improved submerged combustion melter for melting materials, notably vitreous or vitrifiable materials, which shows further enhanced energy efficiency.

The present invention further seeks to provide a highly efficient process for sintering and/or melting batch materials. Such a process shows reduced energy consumption together with excellent melt characteristics, including homogeneity in terms of temperature distribution and composition, leading to high end product quality. It allows melting of a large variety of materials, notably vitrifiable material and shows a high flexibility in controlling the process parameters.

According to one of its aspects, the present invention provides a submerged combustion melter assembly as defined in claim 1. Other independent claims define other aspects of the invention. Dependent claims define preferred and/or alternative embodiments.

DETAILED DESCRIPTION OF THE INVENTION

The melter and/or the process may be carried out using a method and/or melter disclosed in any of WO 2015/014917, WO 2015/014918, WO 2015/014919, WO 2015/014920 or WO 2015/014921, each of which is hereby incorporated by reference.

It has been found that the invention arrangement and design of the afterburner is particularly efficient and advantageous. First, the invention afterburner section does not require any additional energy input, as it is capable of recovering sufficient energy from the gases emanating directly from the melt pool. Maintaining these gases for a sufficient time at the relevant temperature and pressure conditions, that is ensuring a sufficient residence time of said gases in the afterburner section of the melter itself, has been shown to comply with the requirements an afterburner has to comply with. As a result, the capital investment in the exhaust system may be significantly reduced, as a separate afterburner system mounted in the exhaust system may be reduced in size and/or simplified or completely omitted. Further, no additional energy input is required, which reduces the overall energy consumption of the melter assembly, and hence increases its energy efficiency.

Next, the arrangement and design of the afterburner section according to the invention is simple and shows further advantages with respect to the actual construction and the choice of the construction materials. As the afterburner section is arranged contiguous with and in continuity of the melter section, it may advantageously be made of the same material as the melter section. According to one preferred embodiment, the melter section may comprise double steel walls forming a cooling fluid jacket around the melt bath; the afterburner may be made of the same material. In practice, it suffices to adapt the height of the melter assembly in order to generate a space over the melt bath that complies with the requirements of an afterburner section, that is gas residence times beyond 1 s, preferably beyond 2 s, at a temperature of at least 750° C., preferably 800° C., more preferably 850° C., over the melt level. Preferably, the horizontal cross-section of the afterburner is simply equivalent to that of the submerged combustion melter section, as it is in continuity of same.

If so required, additional heating equipment and/or fuel combustion equipment and/or reagent injections, such as devices for injection of oxygen containing gas, may be arranged in the walls of the afterburner section, in order to allow for appropriate control of the afterburner conditions in normal operating conditions as well as in extreme and/or transitional conditions.

Similarly, heat recovery equipment may be provided at the afterburner section. In practice, the heat recovery equipment may consist in double steel walls forming a cooling fluid jacket around the afterburner section. The cooling fluid temperature and/or flow may advantageously be controlled in order to ensure suitable afterburner conditions.

The afterburner section may comprise baffles in order to avoid melt projections generated by the high turbulence in the submerged combustion melter section escape through the exhaust system.

A raw material feeder known per se may be arranged such as to feed raw materials through the afterburner section. Such feeder arrangement advantageously allows for suitable preheating of the raw material discharged onto the melt pool. In an alternative to the above, or in combination therewith, the raw material feeder may consist in a submerged feeder arranged in the submerged combustion melter section, below the level of the melt.

The invention melter assembly is not limited to particular shapes of either or both of the submerged combustion melter section and afterburner section. As will easily be understood, the submerged combustion melter section may show a polygonal substantially horizontal or transversal cross-section or a circular or ovoidal substantially horizontal cross-section. Similarly, the vertical cross-section may advantageously be trapezoidal or rectangular. For reasons of ease of construction and of mechanical strength, a cylindrical melter assembly is preferred.

According to a preferred embodiment, the submerged burners may be controlled such as to generate high turbulence in the melt by way of combustion gas injection and convectional flows, thereby increasing the melt volume by at least 8%, preferably at least 10%, more preferably at 15%, as compared to the volume the melt would have at the same temperature, but without any submerged burner firing. It has been found that the furnace is the most efficient when the melt density has been reduced by the relevant percentages, by inclusion of gas bubbles.

In connection with the above, the volume of the melt without any submerged burner firing can be calculated on the basis of the raw material load and the temperature. The level of the melt in the melter may be measured by appropriate measuring devices, such as known laser devices or similar, like radar devices or others, which average the level detection over a given time period.

Preferably, the submerged burners are controlled such that no any significant foam layer or no foam layer at all is generated over the top of the melt, because it has been found that a foam layer is counterproductive for the energy transfer in general and the heat exchange more in particular.

The submerged combustion melter section comprises at least one burner, advantageously a single centrally arranged submerged combustion burner. It may advantageously comprise at least 3 or at least 5 burners. Depending on the substantially horizontal cross-section, the burners may be arranged according to an appropriate design pattern. In the case of a rectangular cross-section, the burners may be arranged in the bottom of the melter, along a central axis or along two preferably parallel lines. In the case of an ovoidal transversal cross-section, the burners may be arranged on an ovoidal burner line, at appropriate distance from the melter walls, as is known in the art, in order to avoid unnecessary wear and/or corrosion of the walls or wall lining. In the case of a circular transversal cross-section, the burners may advantageously be arranged on a circular burner line, at appropriate distance from the melter walls. Combinations of the above design patterns with central burners may also be provided. Other combinations are also possible, like an arrangement of the burners on a circular burner line in a melter showing a rectangular transversal cross section. Making use of his/her knowledge, experience and skill, the person skilled in the art will identify the designs suitable for the aims pursued.

According to a particularly preferred embodiment, at least three, preferably at least five, functional submerged combustion burners are arranged at the submerged combustion melter bottom, on a substantially circular burner line at a distance among adjacent burners, in a substantially cylindrical melter assembly, such as to generate a melt flow pattern which when simulated by means of Computational Fluid Dynamics analysis shows a substantially toroidal melt flow pattern in the melt, the flow pattern comprising major centrally inwardly convergent flow vectors at the melt surface, with the central axis of revolution of the toroid being substantially vertical. Preferably, the melt in the melter comprises a single such toroidal flow pattern. Close to the vertical axis of revolution of said toroidal flow pattern, the flow vectors change orientation showing a downward component, hence reflecting significant downward movement of the melt in proximity of said axis. At the melter bottom, the flow vectors change orientation again showing outwardly and then upwardly orientated components.

Preferably the fluid dynamics model code is ANSYS R14.5, taking into consideration the multi-phase flow field with phases ranging from solid batch material to liquid melt, to various gas species associated with both the combustion of fuel and oxidant by the burners as well as those generated in the course of the batch-to-melt conversion process.

The generation of such a toroidal flow pattern ensures highly efficient mixing and homogenizes the melt in terms of temperature profile and composition. Furthermore, the toroidal flow pattern favors the absorption of raw material into the melt, thus improving heat transfer to fresh raw material and reducing required residence time in the melter prior to withdrawal for further forming, while avoiding or at least reducing the risk of raw material short cutting the melt circulation.

The melt may be withdrawn for further downstream processing, including flat glass or container glass formation, continuous fiber formation or mineral wool fiber production. While a refining of the discharged melt may be effected between the melter assembly and upstream of the forming steps(s), the output is preferably taken directly to fiberization without any specific refining step, in the case of mineral wool fiber production.

The burners may preferably be supplied with a combustible gas, notably comprising hydrocarbon(s), for example natural gas, and an oxygen containing gas, notably oxygen, technical grade oxygen (for example gas having an oxygen content of at least 95% by weight) or oxygen enriched air. Preferably, the combustible gas and the oxygen containing gas are supplied separately to the burner and combined at the burner and/or at nozzle(s) of the burner. Alternatively, other fuel types, for example liquid fuel or solid pulverized fuels, may be used, notably for waste vitrification purposes.

For the sake of clarity, by toroidal flow pattern it is meant that the speed vectors of the moving fluid material, generated by simulation by means of Computational Fluid Dynamics analysis form a circulation pattern in which they fill cross-sections of a toroid which has as its central axis of revolution the vertical axis passing through the center of the substantially circular burner circle and as outer diameter approximately the outer diameter of said circular burner zone, with material flowing from the outside to the center at the melt surface. Such toroidal flow entrains fresh raw material centrally and deeply into the glass melt and improves the efficiency in transmitting heat to the fresh raw material in order to melt it quickly and easily and further enhance homogeneity of the melt in terms of both, composition and temperature.

Melt may be withdrawn continuously or batch wise, for example laterally. A syphon-type outlet structure may be arranged at about the melt level, for continuous withdrawal and advantageous control of the melt outlet and melt level. In the case of discontinuous discharge of melt, opening and closure of a discharge hole at about the bottom of the submerged combustion melter section may be controlled, for example by a ceramic piston.

The submerged burners preferably inject high pressure jets of the combustion products into the melt sufficient to overcome the liquid pressure and to create forced upward travel of the flame and combustion products. The speed of the combustion and/or combustible gases, notably at the exit from the burner nozzle(s), may be 60 m/s, 100 m/s or 120 m/s and/or 350 m/s, 330 m/s, 300 or 200 m/s. Preferably the speed of the combustion gases is in the range of about 60 to 300 m/s, preferably 100 to 200, more preferably 110 to 160 m/s.

The temperature of the melt may be between 1100° C. and 1600° C. or 1650° C.; it may be at least 1200° C. or 1250° C. and/or at most 1500° C. or 1450° C. depending on the composition of the batch material and on the desired viscosity of the melt. According to a preferred embodiment, the melting chamber walls comprise double steel walls separated by circulating cooling liquid. Particularly in the case of a cylindrical melting chamber, such assembly is relatively easy to build and is capable of resisting high mechanical stresses. A cylindrical shape of the melter facilitates balance of stress on the outside wall. As the walls are cooled, preferably water cooled, melt solidifies and forms a protective layer on the inside of the melter wall. Preferably, the melter assembly does not require any internal refractory lining and therefore needs less or less costly maintenance than prior art melters. In addition, the melt is not contaminated with any undesirable components of refractory material eroded from the internal refractory lining. In the case of a glass melt for instance, glass solidifies on the cooled wall and forms an insulating layer or boundary layer; glass is thus melted in glass and the melt is not contaminated with erosion residues of any refractory material. The internal face of the melter wall may advantageously be equipped with tabs or pastilles or other small elements projecting towards the inside of the furnace. These may help constituting and fixing a layer of solidified melt on the internal melter wall which generates a thermal resistance and reduces the transfer of heat to the cooling liquid in the double walls of the melter.

The melter assembly of the invention may be equipped with heat recovery equipment; hot fumes from the melter assembly may be used to preheat raw batch material or the thermal energy contained in them may be extracted and/or used for other purposes in upstream or downstream equipment of a production line, e.g. a production line for insulating fiber products. Similarly, the thermal energy contained in the cooling liquid circulating between the double steel walls of the melter assembly, including submerged combustion melter section and possibly afterburner section, may be recovered and used for appropriate purposes, including in upstream and/or downstream equipments of a production line.

The melter may be adapted and/or configured to sinter and/or melt raw materials. It may be a "glass melter", that is to say a melter adapted and/or configured to melt glass-like materials including materials selected from glass, vitreous materials, stone and rock. A glass melter may be used to manufacture flat glass, hollow glass, glass fibers, continuous fibers for reinforcement purposes, mineral fibers for insulation purposes, mineral wool, stone wool or glass wool. The melter may be used to transform raw materials to manufacture frits, cement clinker, notably alumina cement clinker, or abrasives, notably abrasives produced by melting. The melter may be used to transform raw materials, notably by vitrification, for example: vitrification of medical wastes; vitrification of ash, notably from incinerators; vitrification of powders, for example dusts from cast iron or other metal foundries; vitrification of galvanic sludge, tannery sludge or mining industry waste; disposal of waste, notably by vitrification, for example, of polluted soil, soil polluted by heavy metals or tar, clay filters, sludge, activated carbon, radioactive waste, slags containing lead or zinc, refractories, notably refractories containing chromium. Particularly in the case of a glass melter, the raw materials may comprise: silicates, basalt, limestone, soda ash, zeolite catalyst, spent catalyst, spent pot liner, refractory materials, aluminum dross, aluminium melting scum, sand based fire extinguisher waste, sludge, galvanic sludge, clinker, waste materials, ash and combinations thereof.

The disclosed method and melter assembly are particularly suitable to melt all sorts of vitrifiable material in an efficient way, with reduced energy consumption and at reduced maintenance costs. A melter as per the invention is thus particularly attractive for use in a production line for mineral fiber products, for example glass fibers, glass wool and stone wool manufacturing. Particularly in the case of mineral wool fiber production, the output is preferably taken directly to fiberization without a refining step.

In the case of a glass melt, the composition of the melt produced may comprise one or more of:

|  | Possible melt composition (% weight) | Preferred melt composition (% weight) |
| --- | --- | --- |
| $SiO_2$ | 35-70 | 40-65 |
| $Al_2O_3$ | 5-30 | 15-25 |
| CaO | 5-20 | 5-12 |
| MgO | 0-10 | 1-7 |
| $Na_2O$ | 0-20 | 5-18 |
| K2O | 0-15 | 0-10 |
| $Fe_2O_3$ (total iron) | 0-15 | 0.5-10 |
| $B_2O_3$ | 0-10 | 0-5 |
| $TiO_2$ | 0-5 | 0-2 |
| $P_2O_5$ | 0-3 | 0-2 |
| MnO | 0-3 | 0-2 |
| $Na_2O + K_2O$ (alkali metal oxide) | 5-30 | 5-20 |
| CaO + MgO (alkaline earth metal oxide) | 5-30 | 5-20 |
| SiO2 + Al2O3 | 50-85 | 60-80 |

The boron content of glass produced, expressed as B2O3, may be 1 w %, 2 w %, 3 w %, 5 w % and/or 20%, 18%, 15% or 10 w %.

Figure 1:
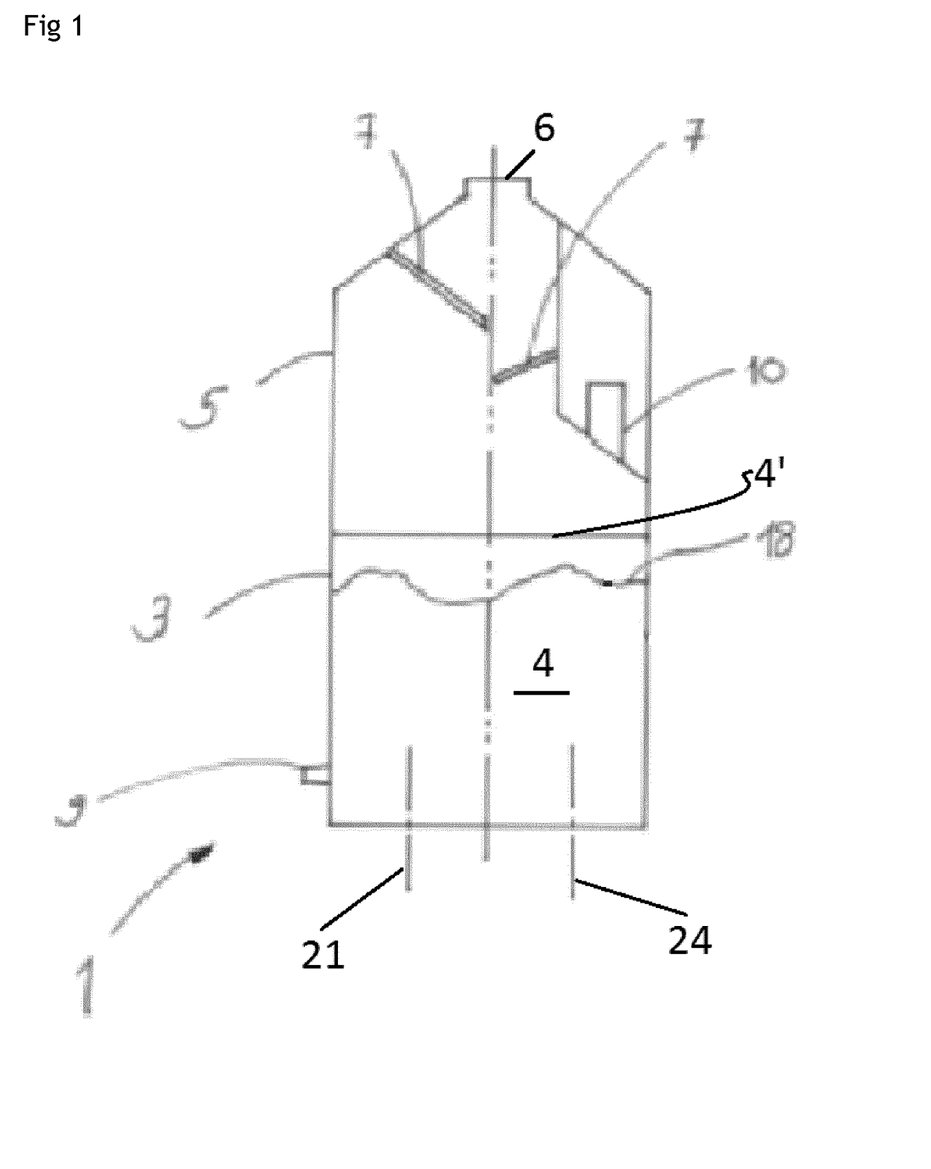
FIG. 1 schematically shows a vertical section through a melter assembly.
Figure 2:
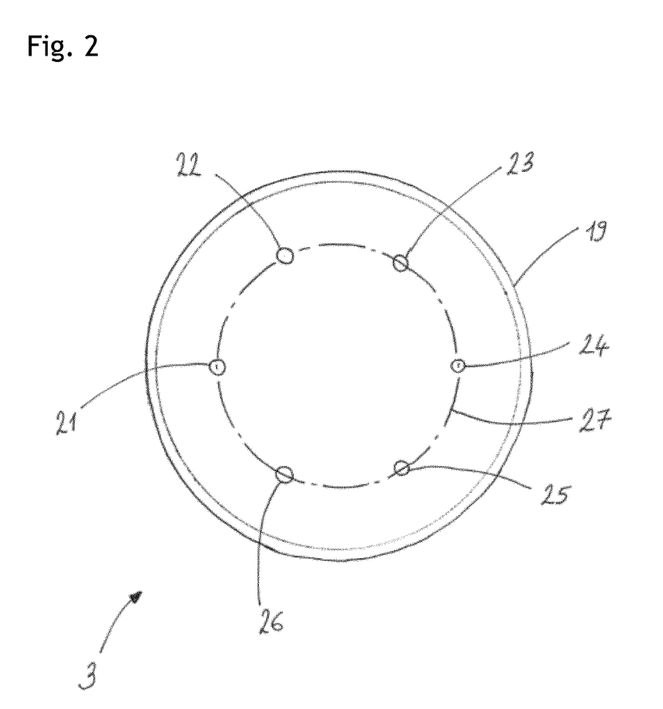
FIG. 2 is a schematic representation of a burner layout.

An embodiment of the present invention will be described in more details below, with reference to the appended drawings of which:

FIG. 1 schematically shows a vertical section through a melter assembly;

FIG. 2 is a schematic representation of a burner layout; and

Figure 3A:
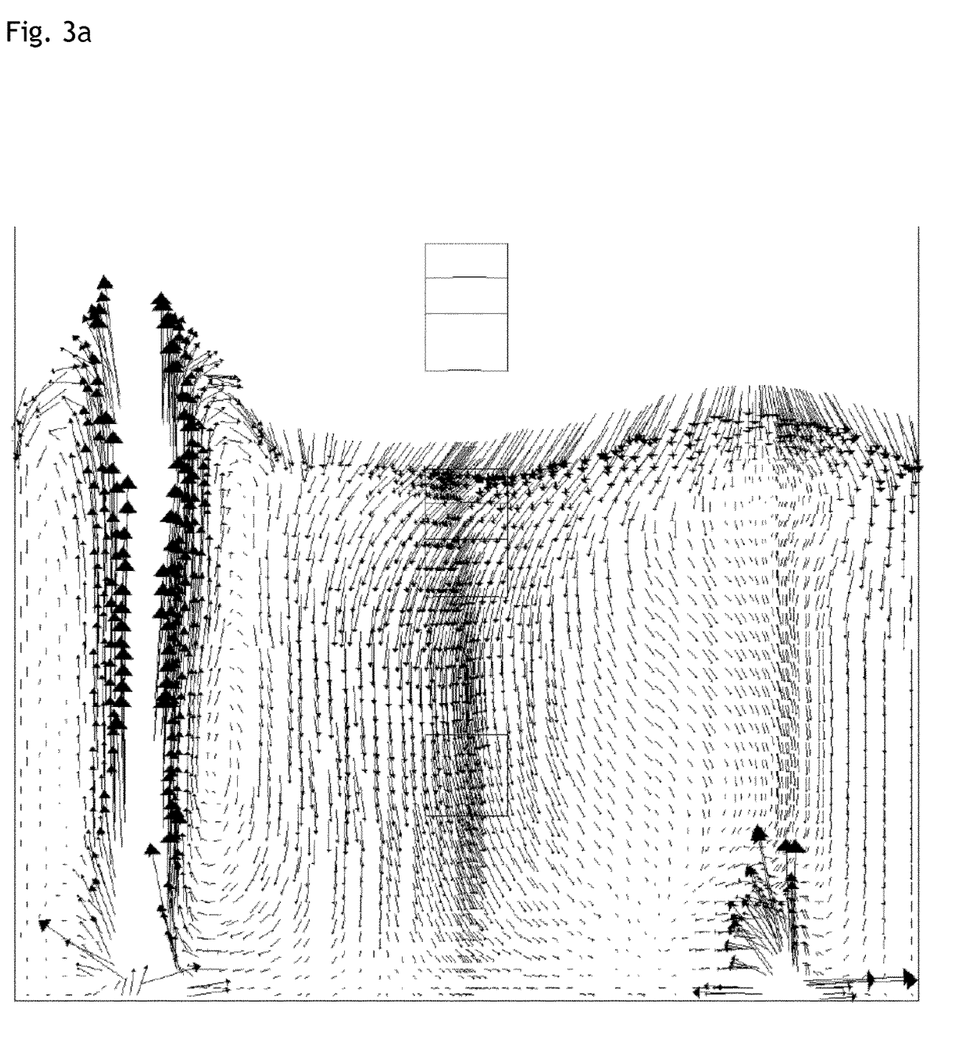
FIG. 3a and 3b are representations of a toroidal flow pattern generated by computer simulation.
Figure 3B:
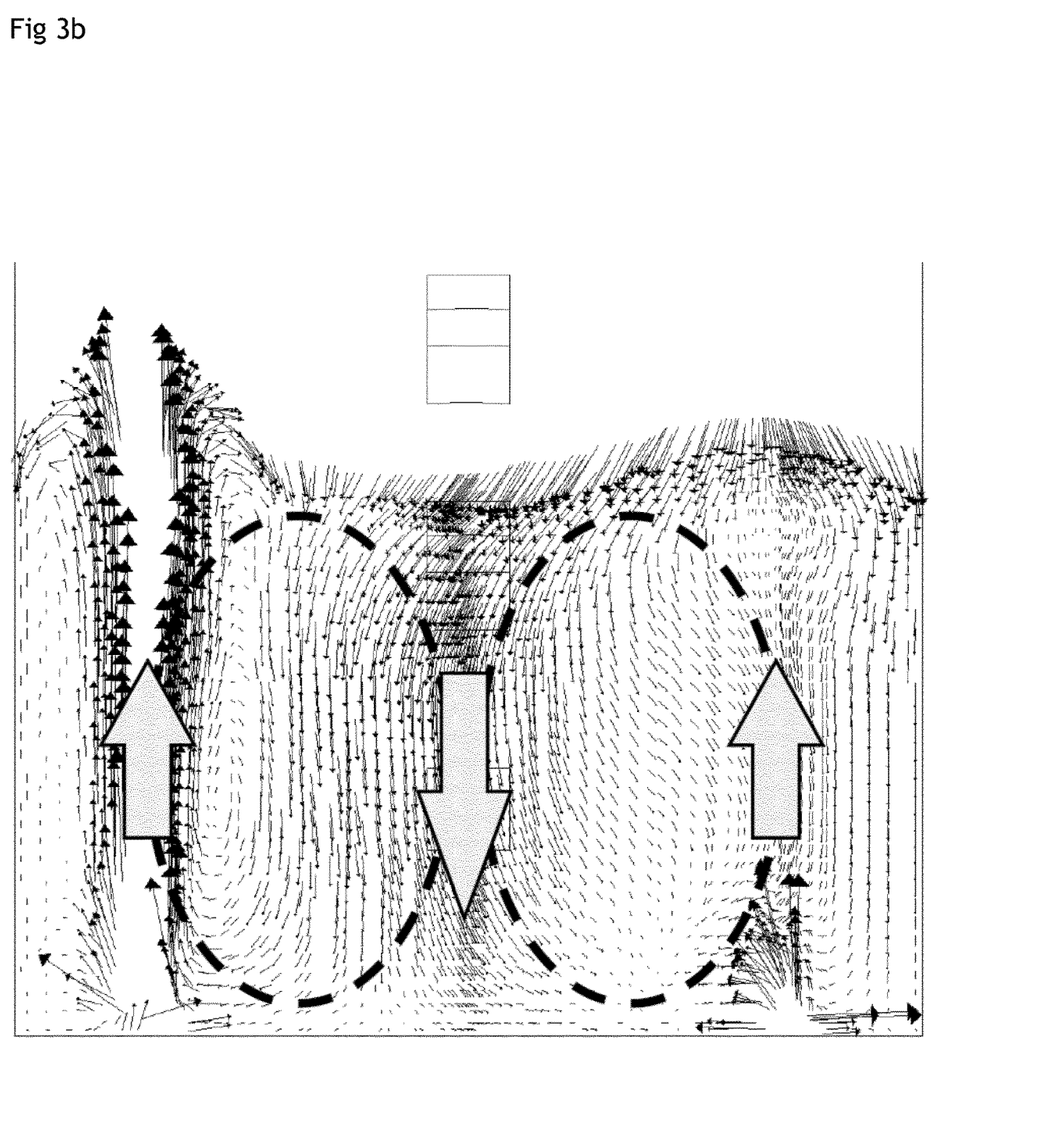

FIGS. 3a and 3b are representations of a toroidal flow pattern generated by computer simulation.

FIG. 1 shows a melter assembly 1 according to the invention comprising a submerged combustion melter section 3 and an afterburner section 5. The submerged combustion melter section 3 is designed to contain the melt bath 4 at a maximum melt level 4' and comprises at least one submerged combustion burner 21,24 and a melt outlet 9. In the exemplified embodiment, the outlet 9 is arranged near the bottom of the submerged combustion melter section and may be controlled by a piston for batchwise unload of melt contained in the submerged combustion melter section 3. The afterburner section 5 is designed as a space contiguous with, and in continuity of, the internal space defined by the submerged combustion melter section 3, and arranged over the maximum melt level 4' of the submerged combustion melter section 3. The horizontal or transversal cross-section of the afterburner section is substantially equivalent to that of the submerged combustion melter section 3. The afterburner section 5 is dimensioned such that, under normal operating conditions, the gases escaping from the melt bath 4 contained in the submerged combustion melter section 3 remain for about 2 seconds at a temperature of at least 850° C. in the space delimited by the said afterburner section. Hence the afterburner section is designed to comply with the general understanding of an afterburner. The afterburner section 5 is further connected to an exhaust gas outlet 6. It may further comprise baffles 7 in order to avoid that melt projections generated by the heavy turbulence of the melt 4 contained in the submerged combustion melter section 3 are entrained in the effluent gas flow with all disadvantages that may entail with respect to deposition of solidifying or solidified melt projections and clogging of certain elements of the exhaust system. In the exemplified embodiment, a raw material feeder 10 is arranged in the afterburner section and is designed to discharge vitrifiable raw material over the top of the agitated melt bath 4. As described hereabove, a raw material feeder may also be provided for at the submerged combustion melter section; such a raw material feeder then preferably consists in a submerged feeder and may be provided for as an alternative to or in addition to the feeder 10 described hereabove.

As can be seen in FIG. 2, the melter assembly 3 has a circular transversal cross-section 19. The melter assembly comprising melter section and afterburner section represented in the figures is advantageously substantially cylindrical. Submerged combustion generates high stress components that act on the melter walls and the melter is subjected to heavy vibrations. These may be significantly reduced in the case of a cylindrical melting chamber. If so desired, the melter may further be mounted on dampers which are designed to absorb most of the vibrational movements. Six burners 21,22,23,24,25,26 are arranged on a circular burner line 27. For the sake of clarity, the design represented in the figures has a preferred layout with six submerged burners distributed around the burner line. Different layouts are possible depending on the dimensions of the melter, the viscosity of the melt and the characteristics of the burners.

The walls, including bottom and side walls, of the submerged combustion melter section 3 consist in double steel walls. Cooling fluid, preferably water, is circulated between said walls in order to cool. Similarly, the side walls of the afterburner section also consist in double steel walls cooled by circulating cooling fluid, preferably water. Cooling water connections are provided for on the external walls. Such connections are known per se and should be calculated to allow a flow of cooling fluid sufficient to withdraw energy from the inside wall such that melt can solidify on the internal wall at about 150° C. and the cooling liquid, here water, does not boil The submerged combustion burners 21,22,23,24,25,26 may comprise concentric tube burners (also known as tube in tube burners) operated at gas flow or speed in the melt of 100 to 200 m/s, preferably 110 to 160 m/s. The burners preferably are designed such as to generate combustion of fuel gas and air and/or oxygen within the melt. The combustion and combustion gases generate high mixing within the melt before they escape into the afterburner section 5 and then through the chimney 6. These hot gases may be used to preheat the raw material and/or the fuel gas and/or oxidant (air and/or oxygen) used in the burners. The fumes generally are filtered prior to release to the environment. Where filtering needs to occur at reduced temperatures, prior dilution of fumes with cooler ambient air may be used.

In normal operation, submerged burners 21,22,23,34,35,26 inject high pressure jets of combustion products of oxygen and fuel, preferably propane gas, into the melt sufficient to overcome the liquid pressure in the melt and to create forced upward travel of the flame and combustion products. The speed of the combustion and/or combustible gases, notably at the exit from the burner nozzle(s), may be 60 m/s, 100 m/s or 120 m/s and/or 350 m/s, 330 m/s, 300 or 200 m/s. Preferably the speed of the combustion gases is in the range of about 60 to 300 m/s, preferably 100 to 200, more preferably 110 to 160 m/s. The combustion gases hence generate high turbulence in the melt bath which ensures suitable energy transfer between the hot gases and the melt and/or fresh raw material absorbed in it. The high turbulence thereby ensures a homogenous melt in terms of composition and temperature.

The submerged burners are controlled such that the injected combustion gas and the convection flows within the melt generate a turbulence such that the volume of the aerated melt is about 30-50% higher than the volume the melt would have without any submerged burner firing. Preferably, the submerged burners are controlled such as not to generate any significant foam layer or no foam layer at all at the top of the melt.

Furthermore, submerged burners 21,22,23,24,25,26 are arranged in the cylindrical submerged combustion melter section and controlled in such a way that a toroidal melt flow pattern is generated in the melter section. The distance between burners is comprised between 250 and 900 mm, preferably about 300-800. Further, the burners are arranged at a suitable distance of about 150-750 mm from the side wall of said submerged combustion melter section 3; this favors the flow described above and avoids flame attraction to the melting chamber side walls. Too small a distance between burners and side wall may damage or unnecessarily stress the side wall. Reference is made to FIGS. 3a and 3b. Melt follows an ascending direction close to submerged burners arranged on a substantially circular burner line, flows inwardly towards the center of the relevant circle line, at the melt surface, and then downwards again, in proximity of the said center. Such toroidal flow ensures good stirring of the melt and absorption of fresh raw material. The skilled person will need to adapt the distance between burners and between burner and wall, for given burner designs, such as to avoid the burner flames fuse or are attracted to the wall or otherwise diverted from the central burner axis As will be understood, additional flow circulations may take place. Melt may flow between burners and side wall. Other flows may take place between burners. These are not necessarily disadvantageous and, to the contrary, may even be desirable.

The toroidal flow pattern has been generated by computer simulation, taking into consideration common Eulerian, multi-phase fluid dynamics modeling techniques familiar to those skilled in the art. The computational fluid dynamics code selected for this exercise advantageously is ANSYS R14.5. The model advantageously takes into consideration the multi-phase flow field spanning the full range of mixture fractions from dispersed gas bubbles in liquid to distributed solid particles or liquid droplets in gas, with the solid phase batch undergoing a multi-phase, thermo-chemical conversion reaction to produce liquid phase melt and gas phase species. The system utilizes submerged combustion of fuel and oxygen gas phase species to produce carbon dioxide and water vapor. In addition, the melt viscosity is highly temperature dependent. The complex batch-to-melt conversion process may be modeled with the reaction step following an Arrhenius rate law with Arrhenius reaction rate $k=AT^2 e^{(-E/T)}$
the Arrhenius rate constants being taken from the literature (see A Ungan and R Viskanta, "Melting behavior of continuously charged loose batch blankets in glass melting furnaces", Glastech. Ber. 59 (1986) Nr. 10, p. 279-291). The molar ratios of the batch gases in this reaction are consistent with the production of 0.0503 kg $CO_2$ and 0.0258 kg $H_2O$ from 1 kg batch. The heat of reaction accounts for all energy required to convert batch into liquid phase melt and gas species, including both chemical conversion and phase change heat requirements. Physical properties for the batch and melt may be taken from literature as far as available and/or may be determined by methods known per se. Radiation heat exchange is simulated using the Discrete Ordinates Radiation model, with the gas phase absorption coefficient estimated using the Weighted Sum of the Gray Gases model, the melt absorption coefficient specified (to a high value of 300 l/m) and the batch absorption coefficient advantageously specified so as to render it opaque relative to the other fluids. While the melt is assigned as the primary fluid phase and the gases are assigned as the secondary fluid phase having uniform bubbled diameter of 5 mm. Momentum exchange among the liquid and gas phases above the anticipated bath height is artificially suppressed.

In an example of a melter assembly of the invention, the illustrated submerged combustion melter section 3 shows a diameter of about 2.0 m. The submerged burners are arranged on a circular burner line concentric with the burner axis and having a diameter of about 1.4 m. The distance between submerged combustion burner and wall is about 0.10-0.20 m. The temperature within the melt may be comprised between 1100° C. and 1600° C. or 1650° C., or 1200° C. and 1500° C., or 1200° C. and 1450° C., preferably 1250° C. and 1400° C., depending on the composition of the melt, desired viscosity and other parameters. For computational fluid dynamics modeling of the melter described above (see flow pattern shown in FIG. 1), a batch inlet of 0.833 kg/s at inlet temperature of 27° C. was set in the model, consistent with a 72 T/day production rate. Burner inlet was set as follows: firing rate=5.2 WM (based on LHV); mass flow rate of 0.109 kg/s per burner; molar composition=0.11 $C_3H_8$, 0.89 $O_2$; inlet temperature of 15° C. The walls were modeled by specifying a uniform surface temperature of 152° C. behind a thickness of solidified glass which serves as an insulator. The thermal conductivity specified for the glass is 1 W/mK. The glass thickness, nominally 15 mm, is varied to achieve an average heat flux of from 50 to 70 kW/m².

It has been found that the exhaust system of the invention melter assembly may be designed with either a reduced or simplified afterburner or that the afterburner may be completely omitted in the exhaust system mounted downstream of the melter assembly. In any of the above situations, the capital investment required for the construction of a glass melter is significantly reduced. Concomitantly, the energy requirements for operating a submerged combustion melter are further reduced as well, hence improving the energy efficiency, because of a reduced afterburner or omission thereof in the exhaust system mounted downstream of the melter assembly. It has been determined that the exemplified invention melter assembly with integrated afterburner no longer requires any afterburner known per se for arrangement in the exhaust system downstream of the melter assembly.

A melter according to the invention is particularly advantageous in a glass fiber, glass wool or stone wool production line or a production line for flat glass or hollow glass, because it is particularly efficient leading to reduced energy consumption and increased flexibility which allows for easy changes of raw material composition. Ease of maintenance and low production costs of the invention melter assembly are of major interest in building a production line comprising such a melter. It is well within the experience and skill of the person skilled in the art to design a production line as described above which comprises suitable energy recovery means and means for use of the recovered energy in relevant equipments in the production line, such as for example preheating of raw material, preheating of fuel and/or oxidant adduced to the burners, heating of ovens mounted downstream of the forming equipment etc.

Flat glass, hollow glass, continuous fibers or mineral wool fibers, glass wool or stone wool may be produced in an advantageous manner by melting suitably selected vitrifiable raw material in a melter assembly as described above, and withdrawing glass melt from said melter assembly for downstream processing into flat glass, hollow glass, such as glass containers, glass fibers, glass wool or stone wool. The process may be adapted to the final product by the choice of appropriate downstream processing.

What is claimed is:

1. A melter assembly for melting solid raw batch material comprising a submerged combustion melter section (3) and an afterburner section (5), wherein the submerged combustion melter section (3) is designed to contain a melt bath (4) at a maximum melt level (4') and comprises at least one submerged combustion burner (21, 24) supplied with a combustible gas, and a melt outlet (9), and wherein an afterburner section (5) is designed as an integrated space contiguous with, and in continuity of, a internal space defined by the submerged combustion melter section (3), comprising a same transversal cross-section as a horizontal cross-section of the submerged combustion melter section (3), and arranged over the maximum melt level (4') of the submerged combustion melter section (3), and is dimensioned such that under normal operating conditions, gases escaping from the melt bath contained in the submerged combustion melter section remain for at least 2 seconds at a temperature of at least 800° C. in the afterburner section (5), which is operably connected to an exhaust gas outlet (6).

2. The melter assembly of claim 1, wherein a raw material feeder (10) is connected to the afterburner section (5).

3. The melter assembly of claim 1, wherein a raw material feeder is a submerged feeder connected to the submerged combustion melter section (3).

4. The melter assembly of claim 1, wherein the afterburner section (5) comprises baffles (7).

5. The melter assembly of claim 1, wherein the afterburner section comprises additional combustion means and/or reagent injection means, such as devices for injection of oxygen containing gas.

6. The melter assembly of claim 1, wherein the afterburner section (5) comprises heat recovery means.

7. The melter assembly of claim 1, wherein the submerged combustion melter section (3) shows a polygonal horizontal cross-section.

8. The melter assembly of claim 1, wherein the submerged combustion melter section (3) shows a substantially circular (19) or ovoidal horizontal cross-section.

9. The melter assembly of claim 1, wherein the submerged combustion melter section (3) shows an essentially trapezoidal or rectangular vertical cross-section.

10. The melter assembly of claim 1, wherein the submerged combustion melter section (3) comprises a substantially centrally arranged submerged combustion burner or at least three submerged combustion burners (21, 22, 23, 24, 25, 26), and wherein said at least three submerged combustion burners are arranged on a substantially annular or ovoidal burner line (27), the said submerged combustion burners being arranged through a bottom of said submerged combustion melter section (3).

11. The melter assembly of claim 1, wherein submerged combustion melter section walls comprise double steel walls separated by a circulating cooling liquid.

12. The melter assembly of claim 1, wherein afterburner section walls comprise double steel walls separated by a circulating cooling liquid.

13. A production line for flat glass, hollow glass, glass fibers, glass wool or stone wool, comprising a) the melter assembly (1) of claim 1; b) energy recovery means; and c) means for use of the recovered energy in relevant equipments of the production line, such as preheating of raw material, preheating of fuel and/or oxidant adduced to the melter burners, heating of ovens mounted downstream of the forming equipment.

14. A process for the production of flat glass, hollow glass, continuous fibers or mineral wool fibers, glass wool or stone wool, comprising melting vitrifiable raw material in the melter assembly (1) of claim 1, and withdrawing glass melt from said melter assembly for downstream processing into flat glass, hollow glass, continuous glass fibers, glass wool or stone wool.

15. The process of claim 14, wherein the submerged burners are controlled such that a volume of aerated melt is at least 8% higher than a melt volume would have at a same temperature without any burner firing.

16. The melter assembly of claim 1, wherein the combustible gas supplied to the at least one submerged combustion burner is selected from the group consisting of hydrocarbon(s), natural gas, oxygen, technical grade oxygen, oxygen enriched air and combinations thereof.

17. The melter assembly of claim 1, wherein the at least one submerged combustion burner supplied with a combustible gas is capable of injecting combustion products into the melt bath at a burner exit velocity of about 60-300 m/s.

18. The melter assembly of claim 1, wherein the at least one submerged combustion burner supplied with a combustible gas is capable of injecting combustion products into the melt bath at a burner exit velocity of about 100-200 m/s.

* * * * *